United States Patent [19]

Daly et al.

[11] Patent Number: 5,754,222

[45] Date of Patent: May 19, 1998

[54] VISUAL CHARACTERIZATION USING DISPLAY MODEL

[75] Inventors: Scott J. Daly, Scottsville; Hsien Che Lee, Penfield, both of N.Y.

[73] Assignee: Eastman Kodak Company, Rochester, N.Y.

[21] Appl. No.: 612,530

[22] Filed: Mar. 8, 1996

[51] Int. Cl.$^6$ .................. H04N 17/02; H04N 17/04
[52] U.S. Cl. .................. 348/184; 348/708; 364/151; 364/578
[58] Field of Search .................. 382/100, 162, 382/167; 348/643, 645, 649, 651, 655, 656, 657, 708, 184, 189, 190, 569, 185, 186; 364/149, 150, 151, 578; H04N 17/04, 17/00, 17/02

[56] References Cited

U.S. PATENT DOCUMENTS

| | | | |
|---|---|---|---|
| 3,775,592 | 11/1973 | Ando et al. | 364/149 |
| 4,760,447 | 7/1988 | Koka et al. | 358/139 |
| 4,862,265 | 8/1989 | Bartow et al. | 358/139 |
| 4,897,721 | 1/1990 | Young et al. | 348/190 |
| 5,027,420 | 6/1991 | Takebayashi et al. | 382/167 |
| 5,212,546 | 5/1993 | Arazi et al. | 358/80 |
| 5,296,947 | 3/1994 | Bowers | 358/527 |
| 5,298,993 | 3/1994 | Edgar et al. | 348/180 |
| 5,617,321 | 4/1997 | Frizelle et al. | 364/151 |

*Primary Examiner*—John K. Peng
*Assistant Examiner*—Jeffrey S. Murrell
*Attorney, Agent, or Firm*—Thomas H. Close

[57] ABSTRACT

A method for detecting the characteristics of a display, comprises the steps of: creating a model of the display having multiple parameters relating the physical output of the display to an input signal creating the display; employing a model of the human visual system, generating a set of control signals for producing patterns in the display that enable an observer to employ visual selection criteria to identify specific patterns corresponding to specific values of the parameters; applying the set of control signals to the display to produce the patterns; selecting specific patterns from the display; determining the values of the parameters from the patterns selected; and determining the characteristics of the display by applying the values of the parameters to the model.

16 Claims, 8 Drawing Sheets

VISUAL CHARACTERIZATION USING DISPLAY MODEL

FIELD OF THE INVENTION

This invention relates to the visual characterization of a display and more particularly to the characterization of a display without the use of calibration hardware.

BACKGROUND OF THE INVENTION

We shall refer to the use of the human visual system to achieve an instrumentless display characterization as visual characterization. The advantages in using a human observer rather than an instrument include the savings in cost and training. The disadvantages are that visual characterization is less accurate than an instrument based technique. As a result, there arise various applications where one may be more suited than the other. The key issue is a cost/quality trade-off. Some of the applications include softcopy proofing, desktop-publishing, calibration of display tone scales for teleconferencing or any general image exchange, and calibrating images for scientific visualization.

Several prior art techniques for visual calibration of displays have been proposed. U.S. Pat. No. 5,298,993 issued Mar. 29, 1994 to Edgar et al., "Display Calibration" describes the use of matching a high frequency binary pattern to a region of a solid grey level, which is a method that relies on the optics of the eye to average a high frequency pattern. Edgar et al. describe the use of this technique for setting a hardware knob, such as contrast, for calibrating the tone scale of a display. A number of displays are mentioned, including LCDs, raster displays, printers, and copiers. Edgar et al. purport to provide the first objective instrumentless display calibration system or method. Edgar et al. point out that the method of their invention is also applicable to a measurement of the characteristic tone scale of a display. Such a measurement will be referred to herein as characterizing the display. To characterize a tone-scale of a display according to the method disclosed by Edgar et al., one must make many measurements of the output of the display device throughout the grey scale range. This approach is cumbersome, slow and leads to inaccuracies.

U.S. Pat. No. 5,212,546 issued May 18, 1993 to Arazi et al for "Color Correction System Employing Reference Pictures" describes the use of reference pictures in a softproofing application. These reference pictures are intended to be actual images (as opposed to test targets). The approach is to have a calibrated system print several reference images. Then the calibrated reference images are displayed on the desired CRT display, which is manually adjusted (with whatever controls are available to the observer—typically gain and offset) to match as closely as possible their corresponding versions in print form. No guidance is given toward the method of actually calibrating (adjusting) the display to achieve such a goal. Once the matching is completed, then the system displays the reference image along with the actual image the observer is working on. The idea is that the observer can see the comparison of the print and CRT image for the reference picture, then mentally extrapolate how the actual image displayed on the CRT will look when printed out with the same system. Though the Arazi patent uses images as viewed by an observer, they are used to guide the observer in the decision making process of modifying the working image, as opposed to using images viewed by the observer in order to actually calibrate the display. So, rather than being an instrumentless calibrator for displays, this patent actually describes a way of aiding the observer in making mental transformations from CRT to print, so that when the observer makes changes on the CRT image, the observer can imagine what it will look like when displayed on hard copy. The problem with this approach is that it requires an observer having a relatively high level of training to be able to make the mental transformation. Additionally, the results are inconsistent from one observer to the next, or from one observation to the next.

U.S. Pat. No. 4,760,447, issued Jul. 26, 1988 to Koka et al, "Calibration Pattern and Method for Matching Characteristics of Video Monitors and Cameras" describes a calibration target for calibrating an imaging system that captures and prints an image. The calibration target includes a contrast detail (CD) diagram and some patches of various spatial frequencies. The CD diagram is commonly used in the field of medical imaging and comprises a series of disks of different size and contrast. The calibration target is used to guide the adjustment of the analog gain and offset knobs of a CRT to match the hardcopy version of the same captured image. Calibration is attempted by comparing the number of visible disks in contrast detail (CD) diagrams between the printed target and the target as displayed on the CRT. Comparison of the calibration target is intended to provide help in calibrating the CRT to achieve similar spatial image contrast in the hard copy and the CRT. No teaching is provided as to how to actually calibrate the display with regard to these tone and/or spatial parameters. A problem with this approach is that it requires an experienced technician to adjust the CRT in response to the comparison of the targets.

U.S. Pat. No. 5,296,947 issued Mar. 22, 1994 to H. Bowers, "System for Softproofing a Color Reproduction" is in the field of softproofing (i.e. using a computer monitor to simulate the appearance of a halftone offset process in color printing) and describes the use of color patches that address the subtractive primaries of the 3 or 4 dyes (CMYK), as well as the "additive" primaries due to dye overlap (RGB), and the paper's white value. The method described in the Bowers patent is to set up the display such that these 8 colors are matched from the CRT to the hard copy. The preferred embodiment is to use a colorimeter, but they also mention the possibility of settling for a less accurate version by having the observer make a visual match. No statements are actually made regarding the characterization of the display. The shortcoming of this approach is that an accurate visual match of a limited set of colors is difficult, inaccurate and non repeatable for a non trained observer. Furthermore, even if the representative colors are matched, the rest of the color space may not be accurately calibrated.

Therefore there is a need for an improved visual display calibration method that fully characterizes the display.

SUMMARY OF THE INVENTION

The present invention is directed to overcoming one or more of the problems set forth above. According to the present invention, a method for detecting the characteristics of a display, comprises the steps of: creating a model of the display having multiple parameters relating the physical output of the display to an input signal creating the display; employing a model of the human visual system, generating a set of control signals for producing patterns in the display that enable an observer to employ visual selection criteria to identify specific patterns corresponding to specific values of the parameters; applying the set of control signals to the display to produce the patterns; selecting specific patterns from the display; determining the values of the parameters from the patterns selected; and determining the characteristics of the display by applying the values of the parameters to the model.

A unique attribute common to the methods of display characterization according to the present invention is the use of a display model in conjunction with visual models. These methods use psychophysical procedures to determine the observer's response to specifically generated visual patterns. The characterization of the device is determined from an analysis of the observer's responses. The underlying basic sciences include visual psychophysics, visual modeling, and display modeling. A key underlying technology is the interactive computer window system, although some implementations of this invention minimize this need.

One advantage of the method of the present invention over the prior art is that it is more flexible than the methods of the prior art. The observer may set up the display in any favored configuration, and the display can then be characterized by the methods of the present invention. The prior art has not made an attempt to fully characterize the existing display behavior, but rather has used visual calibration to force the display (via readjustment) to have a certain behavior. Although the prior art of Edgar et al. could be applied to the problem of characterizing the grey scale of a display, that method required experiments at many different grey levels. Another important advantage of the present invention is that the use of a display model provides a way of determining the entire grey scale behavior of a display with a minimum number of tests. In addition to the extra time required by the multiplicity of tests required by the prior art, the errors resulting from the test procedure lead to more serious errors, such as non-monotonicity, which is prevented by using the method including a display model according to the present invention.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
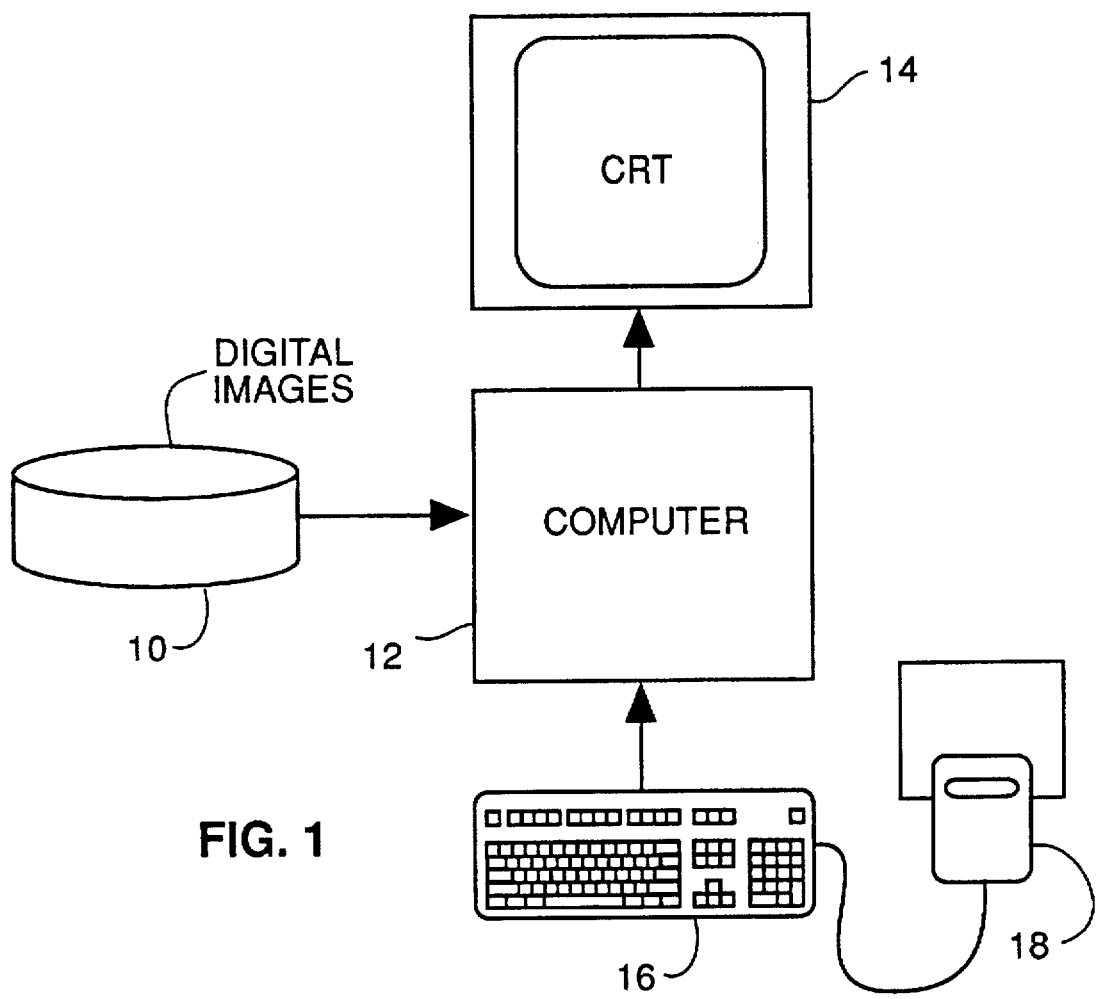
FIG. 1 is a block diagram of an imaging system having a display that can be characterized according to the present invention.

Referring first to FIG. 1, an imaging system having a display that can be characterized by the present invention is shown. The imaging system includes a source of digital images 10, for example an optical disk storage such as PhotoCD™, a digital camera, or a scanner. The digital images are supplied to a computer 12 such as a personal computer or a set-top box, and displayed on a digital display such as a CRT 14 or a hardcopy printer. The CRT 14 may be a computer monitor connected to a personal computer, or a television monitor connected to a set-top box. An observer interface, such as a keyboard 16, a mouse 18 or a television remote control device is connected to the computer or set-top box to enable an observer to interact with the computer or set-top box.

It is desirable to provide a characterization of the display in the system shown in FIG. 1, such that given the characterization, another display device can be used to produce an image that visually matches the display device produced by the system. Such a visual match is desirable for example when using a CRT to simulate the effects that will appear on a print produced by a hardcopy output device (softproofing). In another example, it may be desirable to match the appearance of the display device to an object, for example to match the color of clothing for sale in a home shopping application on a customer's television.

To perform any generic imaging task involving matching an image from one display device to another display device or to a physical object, a characterization of the tone scale is required. For monochromatic displays, this entails measuring luminance, transmittance, or reflectance as a function of grey level. For color displays, the tone scales of the component colors must be measured. To understand the present invention in the context of color science, we will describe the display modeling, visual modeling and psychophysics that relate to the parameters of the display model.

Figure 2:
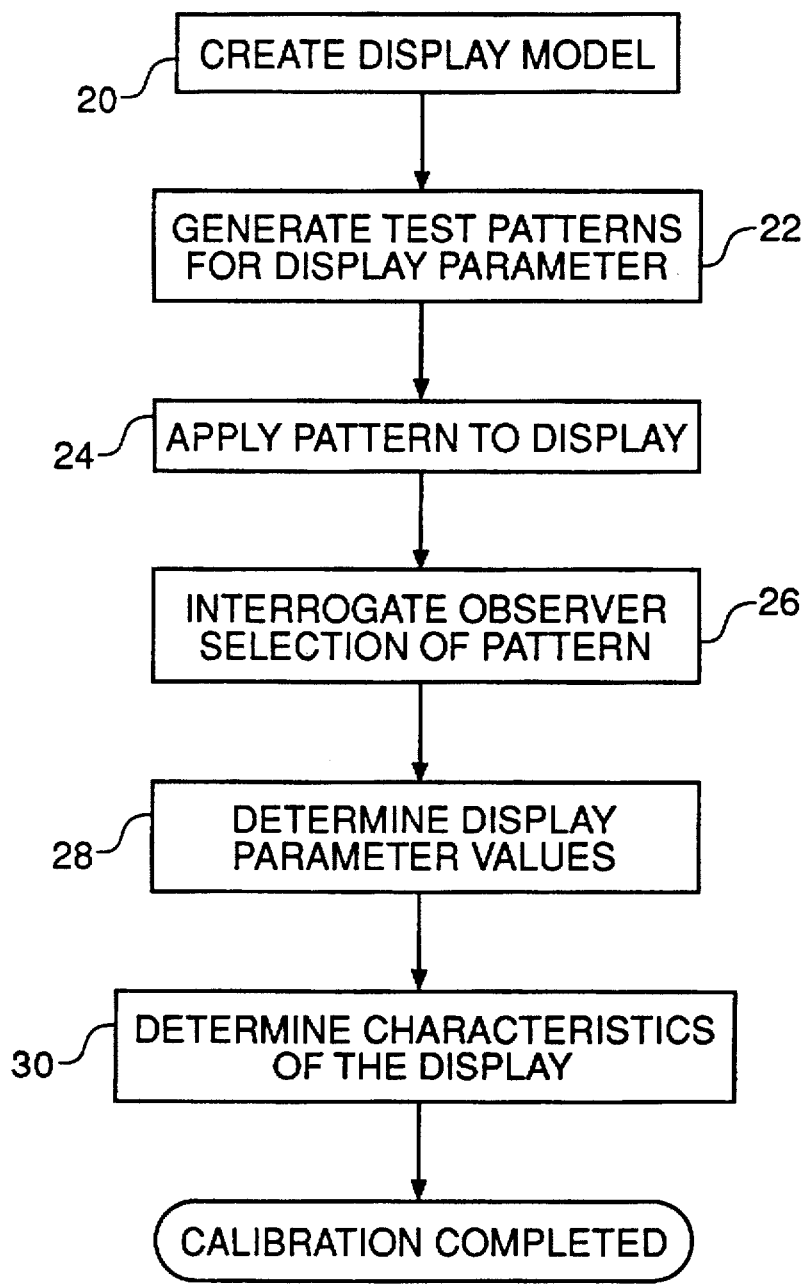
FIG. 2 is a flow chart showing the steps of calibrating a display according to the present invention.

Referring to FIG. 2, the method of display characterization according to the present invention will be described. First, a model of the display is created 20 having a plurality of parameters. Next, a test pattern for each parameter is generated 22 for testing an observer to determine the value of the display parameter using a human visual model. The test patterns are applied to the display 24 and an observer is instructed to select a component of the pattern that meets a specified visual criteria 26. The observer's responses are then used to determine the display parameter values 28. Finally, the values of the display parameters are used in conjunction with the display model to characterize the display 30.

Display Modeling

According to the first step 20 outlined above, a model of the display device is created. A CRT display may be modeled as follows:

$$L = (\alpha V + \beta)^\gamma \phi \quad (1)$$

where L is the luminance emitted from the CRT in response to code value V (the range of V is from 0 to 255 for an 8-bit system), α is the gain and β is the offset, β usually having a negative value. The external light flare within the CRT glass face plate is addressed by the term φ, and we assume this is zero when the CRT is used in a completely darkened room. The value of light coming from the CRT cannot be less than zero, so if $(\alpha V + \beta) < 0$, it is set to zero in this equation.

U.S. Pat. No. 4,862,265 issued Aug. 29, 1989 to Bartow et al. discloses a device for calibrating a CRT that employs a light metering device for measuring the output of the CRT. In the luminance range of the CRT that is too low to measure with the device, a model of the CRT (without the flare component φ) similar to that described above is used to extrapolate the performance of the CRT from the measured data.

For other displays such as continuous tone hard copy, the models will vary depending on the physics of the display. All such models will have the common feature of a series of parameters that can be sequentially estimated. Although the present invention will be described with a CRT as the display, it will be understood that the present invention may be employed to characterize any display. The goal of visual characterization according to the present invention is to determine the parameters of the display model (in the case of the CRT, α, β, γ, and φ) without using any specialized light measuring equipment other than the visual system of the observer. This is done by having the observer look at test patterns and make choices based on what is observed. The choices made by the observer are used to determine the parameters of the display model, which in turn is employed to perform the characterization of the display.

Visual Modeling

In performing the visual characterization of display devices, one needs to consider the behavior of the visual system. The visual system can be modeled at a number of levels of detail. For the context of this invention we consider four levels of increasing sophistication.

The first level model assumes that while a human observer may have difficulty assigning numbers to various perceived brightnesses, the observer's visual system can make comparisons (such as judging which of the two presented patches is the lighter) that are as accurate as needed for this problem. The first level model is then just a simple comparator, with some noise error when the light levels to be compared are nearly equivalent.

The second level model takes into account the blurring due to the optics of the observer's eye. It also utilizes the fact that this blurring occurs in the linear domain of luminance (i.e. the blur can be simulated as a filtering operation acting on the luminance signal). The rest of the visual system is assumed to be a perfect comparator, as in the first level model.

The third level model attempts to model the effects occurring in the neural mechanisms of the retina and the cortex. From psychophysical threshold data, a threshold model of the visual system can be constructed. The model uses the fact that the visual system transduces light into a neural response in a nonlinear fashion. The model also assumes that a threshold response corresponds to a certain size neural response, regardless of its location in the grey scale. Since this threshold response is very small, the model concentrates on the local slope of the nonlinear neural response.

The fourth level of visual modeling that we are concerned with for this invention utilizes a similar visual model as the nonlinear threshold model (third level model), only it does not limit the visual response to threshold. It attempts to model the perceived brightness as a function of luminance, which is a suprathreshold response. The task imposed on the observer is to judge a consistency of brightness differences.

Psychophysical Techniques

There are a number of psychophysical procedures employed to obtain responses from an observer. The four major psychophysical procedures used in the method of this invention include method of adjustment (MOA), two-alternative forced choice (2AFC), multiple-alternative forced choice (MAFC), and method of constant stimuli (MCS).

In the method of adjustment procedure (MOA), the observer simply adjusts a parameter with a computer input device (e.g. using a mouse to adjust a window slider) until some desired visual result is achieved. In the present invention, the desired result will be a match between two stimuli.

The two-alternative forced choice procedure (2AFC) is an approach where the observer is forced to choose between two stimuli, based on a criteria. Usually this criteria is the presence of a signal, which is contained within only one of the stimuli. Generally the signal is gradually reduced based on the observers' responses to repeated iterations and the psychophysical procedure can be programmed to find the observers' threshold (where their chance of seeing the signal is only 50% after correction for guessing).

Multiple alternative forced choice (MAFC) is a variation of 2AFC procedure, where the number of choices is increased to more than two. Though it generally does not give the best data, it can be the quickest of these psychophysical procedures. We will use this procedure in several embodiments of our invention, as its advantage of being the quickest procedure outweighs its disadvantage of being less accurate.

Finally the method of constant stimuli (MCS) is a procedure that can be used with any of the alternative-forced choice procedures. Rather than having the stimulus be programmed to find the observers threshold based on their responses in these tasks, this procedure tests specific stimuli at a number of levels. The observer is instructed to select the component of a test pattern that most closely meets the visual criteria. Often, when these levels are chosen properly, the observer's responses to these can be used to determine the visual response at threshold. In our case we do not find the threshold per se, but get only as close to threshold as the application of the method of the invention necessitates.

Since separate techniques are necessary to determine the four model parameters α, β, γ, and φ, we will address them one at a time in the next four subsections.

Estimation of Parameters

A color CRT display model requires three equations:

$$L_R = (\alpha_R V_R + \beta_R)^{\gamma_R} + \phi_R = \alpha_R^{\gamma_R} \left( V_R + \frac{\beta_R}{\alpha_R} \right)^{\gamma_R} + \phi_R,$$

$$L_G = (\alpha_G V_G + \beta_G)^{\gamma_G} + \phi_G = \alpha_G^{\gamma_G}\left(V_G + \frac{\beta_G}{\alpha_G}\right)^{\gamma_G} + \phi_G, \text{ and}$$

$$L_B = (\alpha_B V_B + \beta_B)^{\gamma_B} + \phi_B = \alpha_B^{\gamma_B}\left(V_B + \frac{\beta_B}{\alpha_B}\right)^{\gamma_B} + \phi_B,$$

where $L_R$, $L_G$, and $L_B$ are the output luminances of the red, green and blue phosphors, $\alpha_R$, $\alpha_G$, and $\alpha_B$ are the gains of the red, green, and blue channels, $V_R$, $V_G$, and $V_B$ are the code values for the red, green, and blue channels, $\beta_R$, $\beta_G$, and $\beta_B$ are the offsets of the red, green, and blue channels, $\gamma_R$, $\gamma_G$, and $\gamma_B$ are the gammas of the red, green, and blue channels of the CRT, $\beta_R/\alpha_R$, $\beta_G/\alpha_G$, and $\beta_B/\alpha_B$ are referred to as normalized offsets, and $\phi_R$, $\phi_G$, and $\phi_B$ are the red, green, and blue components of flare due to external lighting.

Of course, for a monochromatic CRT, only one of the above equations is needed for the model.

The sequence of parameter estimation is to estimate the normalized offsets, $$\frac{\beta_R}{\alpha_R}, \frac{\beta_G}{\alpha_G}, \text{ and}, \frac{\beta_B}{\alpha_B}.$$

Next we use the estimated normalized offsets, and some visual test patterns to estimate the gammas, $\gamma_R$, $\gamma_G$, and $\gamma_B$. Then, we use these estimated parameters and additional visual test patterns to estimate the gain parameters, $\alpha_R$, $\alpha_G$, and $\alpha_B$. Finally, we estimate the flare components, $\phi_R$, $\phi_G$, and $\phi_B$. The detailed procedures for estimating these parameters according to the present invention are described in the following sections. For a color CRT, the procedures are repeated three times, once for each channel. For a monochrome CRT the procedures need to be performed only once.

Estimation of normalized offset $\beta/\alpha$

The first parameter that needs to be estimated is the normalized offset parameter, $\beta/\alpha$, since the other estimation steps depend on its result. From a series of preliminary studies, we concluded that code value changes of 1 (out of the typical 256 levels for an 8-bit display) can be discerned if the shape of the stimulus meets certain criteria. Thus the visual model used to estimate this parameter is a comparator (the first level model discussed above), and we assume its inaccuracy or noise level is on the order of one code value.

From the CRT equation:

$$L = (\alpha V + \beta)^\gamma = \alpha^\gamma\left(V + \frac{\beta}{\alpha}\right)^\gamma,$$

it is seen that L=0 when $$V + \frac{\beta}{\alpha} = 0,$$

and therefore $$V = -\frac{\beta}{\alpha}.$$

The value of $\beta/\alpha$ is usually negative and it represents the fact that the minimum luminance emitted from the display is limited, thereby preventing any modulation in code values less than $$V_{min} = -\frac{\beta}{\alpha}$$

(where $V_{min}$ is the code value which results in the minimum luminance). The parameter $\beta/\alpha$ is then calculated from the resulting grey code value as $$\frac{\beta}{\alpha} = -V_{min}.$$

Figure 3:
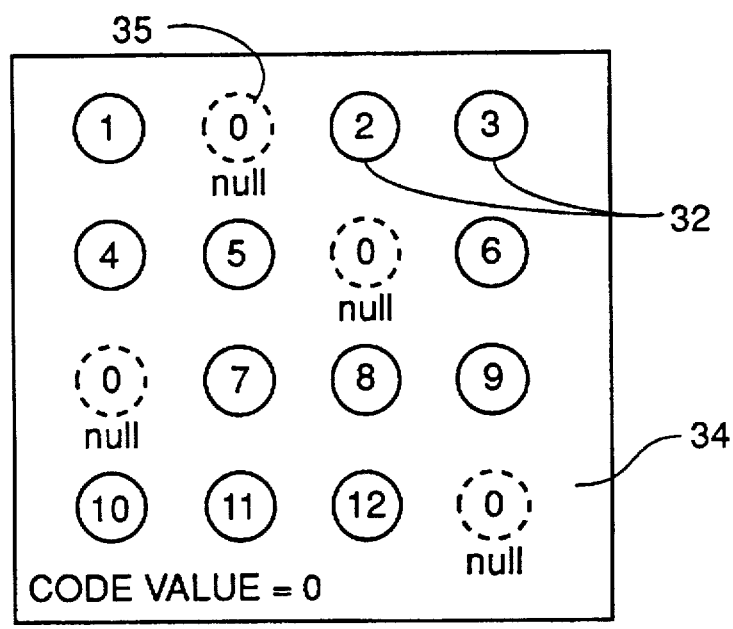
FIG. 3 represents a display pattern for visually estimating the offset parameter used in the method of the present invention.

We determine the ratio $\beta/\alpha$ by displaying a series of circular stimuli on a surround code value of zero. The grey values of these disks will range from zero to the maximum grey code expected for this offset parameter. As shown in FIG. 3, these disks 32 are displayed on a black background 34 produced by a code value of zero. The disks 32 are arranged in a sequence, preferably in normal reading fashion (left-to-right, top-to-bottom) in increasing order from low code value to high code value. The observer is instructed to select the first disk which is visible (i.e. the darkest visible disk). One way of achieving this interrogation is to instruct the observer to use the mouse to click on the first visible disk in the sequence. Note that the use of disk shape is not essential; other geometric shapes may be employed. For noisy displays or those with more than 8 bits, the uniform disks could be replaced with a frequency pattern (i.e. around 4 cycles per visual degree).

Figure 4:
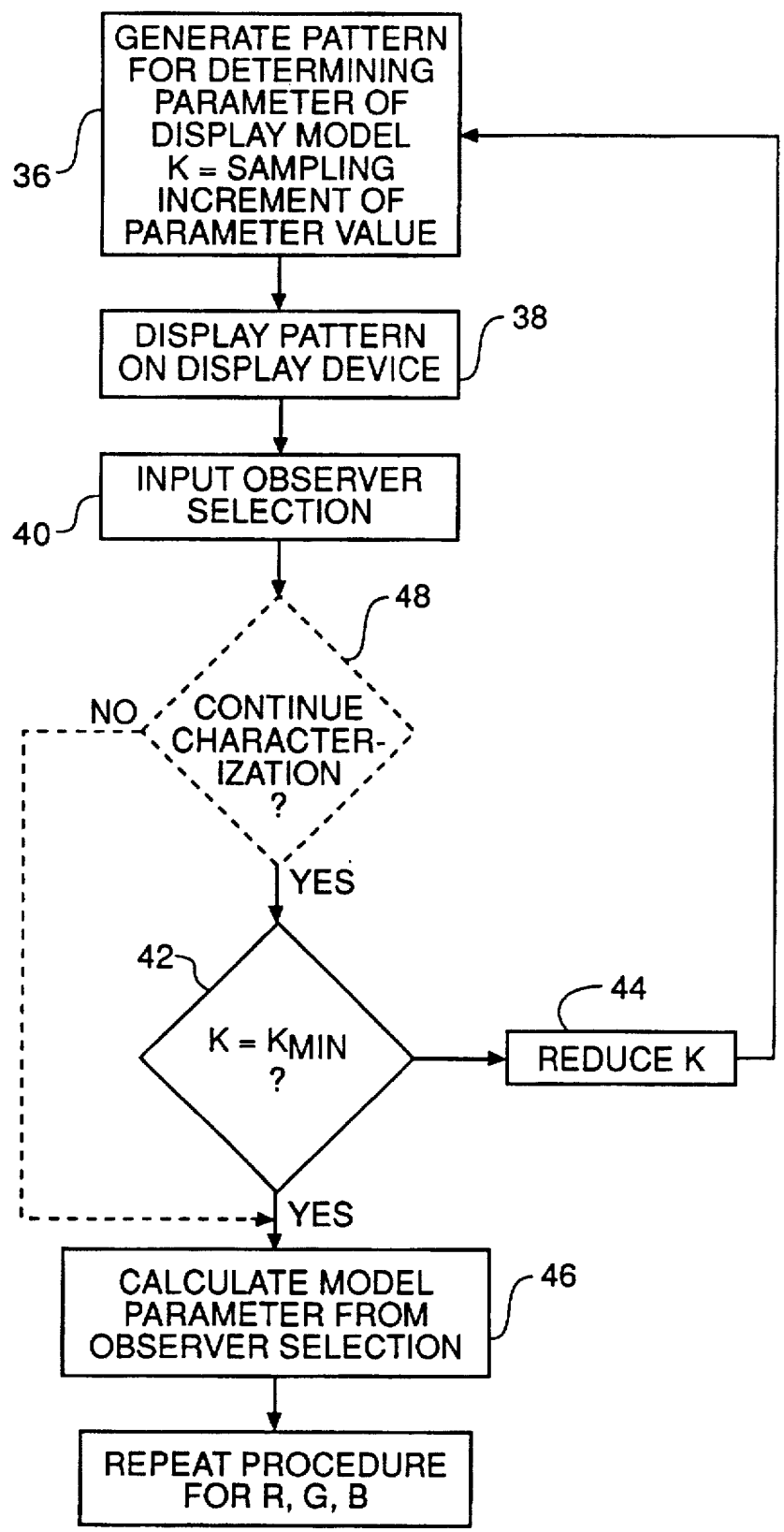
FIG. 4 is a flow chart showing the steps for estimating the offset parameter of the display model.

It has been noted by the inventors that when a number of disks are presented in a regular pattern, some observers will extrapolate the pattern of observable disks to lower light levels than they can actually see. The result of this is that the offset parameter will be underestimated. We avoid this problem by randomly inserting disks of offset value=0 (null disks 35) throughout the series. This technique reduces pattern extrapolation, and the observer's response can be checked to ensure they did not select a null disk. If they did select a null disk, this means they are still choosing based on pattern extrapolation rather than actual visual response. The system can then instruct them to choose only the first disk which is actually visible, and/or insert null disks at different locations and instruct the observer to repeat the observation. Since a pattern of 64 disks (where $V_{min}$=64) plus the null disks takes up a major portion of screen space and/or forces the disks to be a small size, this test can be presented in a step-through fashion as shown in FIG. 4. The first step is to generate 36 a pattern of disks having code values spaced apart by some incremental code value k (e.g. k=4). This presents a smaller subset of the disks. Next, the generated pattern is displayed 38 to the observer. The observer is instructed 40 to select the first visible disk in the displayed pattern. Based on the observers response to this pattern, k is checked to determine if it is at its defined minimum value ($k_{min}$) 42 and if it is not at its minimum value, k is reduced 44 for example by a factor of 2. A new pattern is then generated and shown to the observer. The new pattern halves the size of the code value increments (k) and includes disks having code values centered around the code value of the previously chosen disk. This process is continued until the increments between the disks is equal to $k_{min}$ (e.g. $k_{min}=1$). Finally, the normalized offset parameter $\beta/\alpha$ is calculated 46 from the final observer selection according to equation $$\frac{\beta}{\alpha} = -V_{min}.$$

The offset is thereby determined to the degree of accuracy set by the value of $k_{min}$. This procedure is repeated once for each of the device primary colors in the display (e.g. red, green and blue phosphors for a CRT).

Since this normalized offset parameter $\beta/\alpha$ does not have a strong effect on the other parameters as calculated through the display and visual models, it does not necessarily need to be calculated down to the nearest single code value. An option is to have the observer step through the series of disk-stimuli patterns commensurate with the degree to which the observer cares about image quality. As shown in phantom in FIG. 4, the observer can choose to truncate the test 48 at any point after the first selection is made. This approach can be applied to the other techniques described in this application.

Estimation of $\gamma$

We have developed four methods of determining the $\gamma$ parameter.

Figure 5:
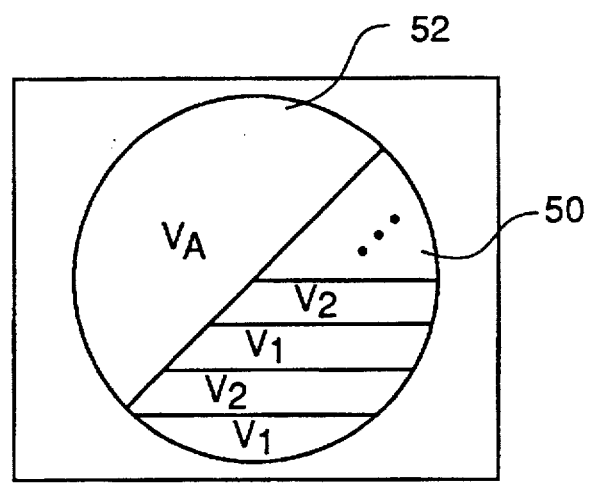
FIG. 5 shows a display pattern for visually estimating the gamma parameter of the display model.

The preferred approach utilizes a visual model that takes into account the blurring due to the optics of the eye. It also utilizes the fact that this blurring occurs in the linear domain of luminance (i.e., the blur can be simulated as a filtering operation acting on the luminance signal). The rest of the visual system is assumed to be a comparator capable of making matches. A high frequency pattern 50 of two code values $V_1$ and $V_2$ are displayed contiguous to a patch 52 of an adjustable code value grey level $V_A$, as shown in FIG. 5. The high frequency pattern 50 will be perceived as a uniform field due to the blurring of the optics of the eye. Using the notation of $L_1$, $L_2$, and $L_A$ for the luminances associated with the code values $V_1$, $V_2$, and $V_A$, we have:

$$L_A = \frac{(L_1 + L_2)}{2} \tag{3}$$

This relationship holds at the retina of the visual system (i.e. after the blurring by the optics of the eye). For the two luminance levels $L_1$ and $L_2$, a complete blurring is mathematically described by the averaging operation in equation 3. If we now substitute equation 1 for the CRT luminance L as a function of these three associated code values $V_1$, $V_2$, and $V_A$, we have:

$$(\alpha V_A + \beta)^\gamma = \frac{(\alpha V_1 + \beta)^\gamma + (\alpha V_2 + \beta)^\gamma}{2} \tag{4}$$

and this equation can be solved for $\gamma$ by numerical techniques. However, a preferred technique is to precalculate the levels $V_1$, $V_2$, and $V_A$ by assuming a value for $\gamma$.

$$V_A = -\frac{\beta}{\alpha} + \left[ \frac{1}{2} \left( \left( V_1 + \frac{\beta}{\alpha} \right)^\gamma + \left( V_2 + \frac{\beta}{\alpha} \right)^\gamma \right) \right]^{\frac{1}{\gamma}} \tag{5}$$

Figure 6:
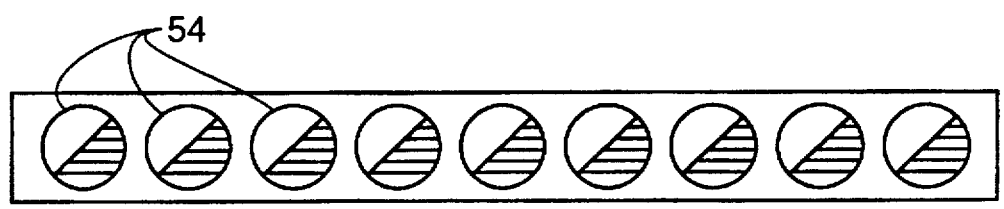
FIG. 6 shows a display pattern consisting of a series of the display patterns of FIG. 5, where the parameters are changed from one single display pattern to the next.

With this technique, a series of patches 54 as shown in FIG. 6, are generated using constant values of $V_1$ and $V_2$, contiguous to various values $V_A$, which are calculated by equation 5 assuming various values for $\gamma$. The observer then selects the patch comparison (corresponding to the various assumed $\gamma$ values) in which the contiguous patches appear most equal (note that this method is combining the psychophysical techniques of MCS and MAFC). This percept is often accompanied by the disappearance of the edge separating them. It is necessary for the observer to view the patches at a sufficiently large viewing distance so that the high frequency pattern blurs into a uniform field. The chosen patch determines $\gamma$ to an accuracy one half that of the quantization of $\gamma$ values used to create the series. A range of 1.5 to 3.2 seems more than sufficient to encompass all displays of which we are aware, and the increments of 0.1 will allow the determination of $\gamma$ to within 5%. This leads to a $\gamma$ value which is accurate enough for color reproduction for all but the most discriminating observers (i.e. some professional applications). The $\gamma$ calculation is performed in a series of steps like those shown in FIG. 4 for the calculation of offset, with the exception that the previously calculated offset parameters for each primary are provided as inputs to the generation 36 of the pattern shown in FIG. 6.

Figure 7:
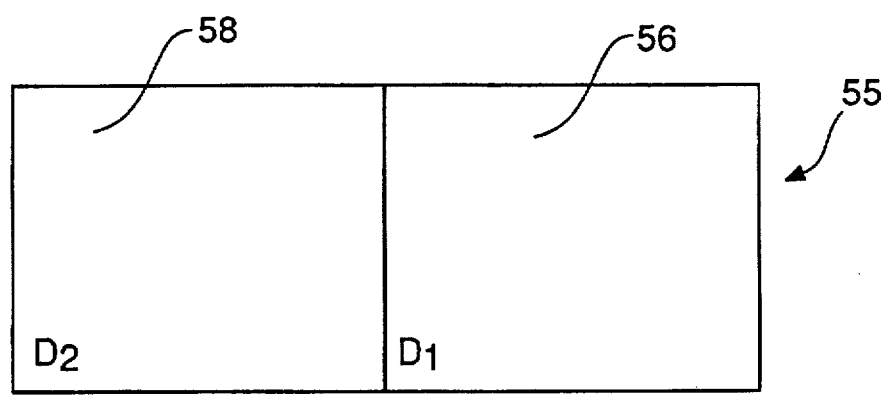
FIG. 7 shows a display pattern used in an alternative method for calibrating gamma, using a transparency.
Figure 8:
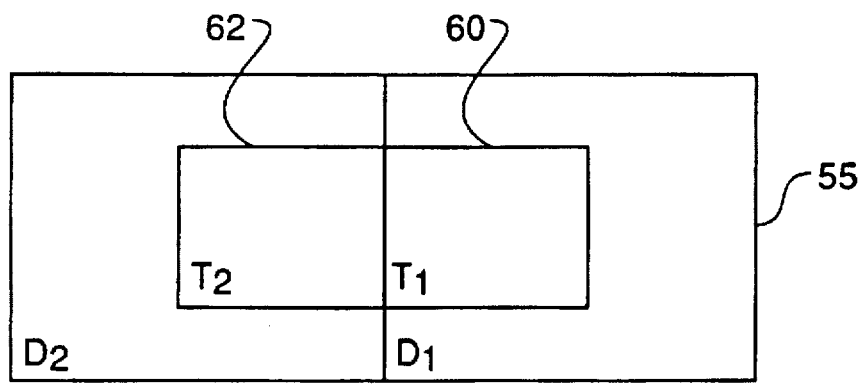
FIG. 8 shows a transparency overlaid on the display pattern of FIG. 7.

According to a first alternate approach for determining $\gamma$, it is assumed that while the observer may have difficulty assigning absolute numbers to various perceived brightnesses, the observer can make comparisons that are as accurate as needed for this problem. As a result of this assumption, the visual system is modeled as a comparator with the capability of detecting a match by default. That is, a match occurs when no comparison judgment can be made because the difference between stimuli is smaller than the accuracy of the visual system to detect a difference. This approach makes use of a transparency 55 of known density (or as preferred, a transparency with two known densities 56 and 58 as shown in FIG. 7). As shown in FIG. 8, two patches 60 and 62 of differing code values are displayed on an interactive display (e.g. CRT), and the transparency 55 is held over one of the patches while the other's code value is adjusted by the observer (i.e. MOA is used) until the light transmitted through the transparency from patches 60 and 62 appear to match in brightness. When a match occurs the observer indicates the match is made and the code value of the adjustable patch is saved. The densities of the transparency patches 56 and 58 are known along with the code values of the two patches 60 and 62, and the luminances of the light transmitted to the eye are assumed to be equal. In general they are not, and this is due to the noisiness of the visual system in making these comparisons. However, the error introduced by this noise can be quantified, and kept low enough that the technique can determine the $\gamma$ parameter to about 5%, which is sufficient accuracy for the intended applications. The equation for the determination of the $\gamma$ term in equation can be derived by knowing that the light reaching the eye from the two patches is equivalent:

$$L_2 = L_1 \cdot 10^{-\Delta D} \tag{6}$$

where $L_1$ and $L_2$ are the luminances from the two patches 60 and 62 before filtering by transparency 55, and $\Delta D$ is the density difference of the two halves of the transparency 55 placed over patches 60 and 62. If we substitute the equation for luminance L as a function of code values $V_1$ and $V_2$ corresponding to the luminance values $L_1$ and $L_2$, and rearrange we have:

$$\gamma = \frac{\Delta D}{\left( \log \left( V_1 + \frac{\beta}{\alpha} \right) \right) - \left( \log \left( V_2 + \frac{\beta}{\alpha} \right) \right)} \tag{7}$$

where $\gamma$ is the desired CRT parameter of equation 1. Note that the normalized offset $\beta/\alpha$ parameter must have already been determined at this point.

Figure 10:
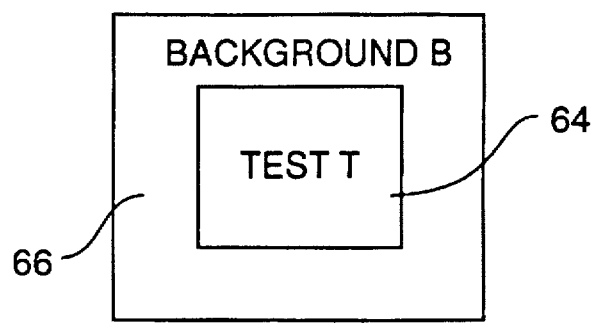
FIG. 10 is a display pattern used in the alternative method of calibrating gamma with the threshold visual model.
Figure 9A:
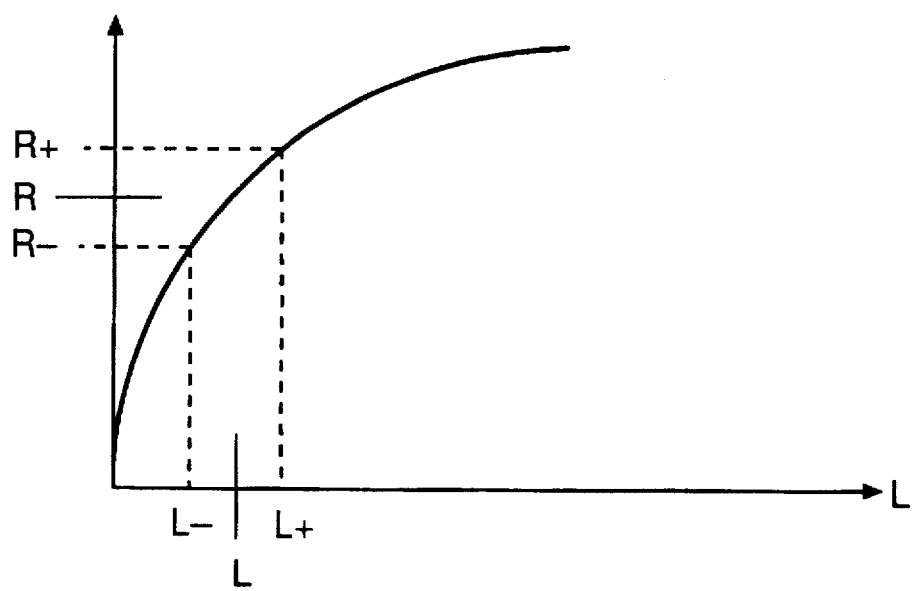
FIG. 9a and 9b are a set of graphs showing the relationship between luminance and code value of the display and the relationship between visual response and luminance useful in describing a further alternative method of calibrating gamma using a threshold visual model.
Figure 9B:
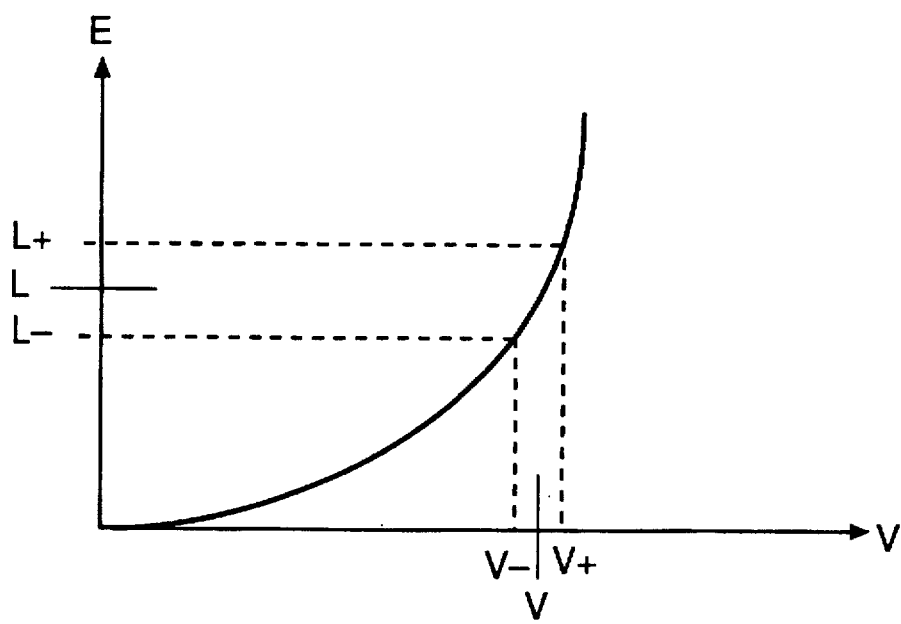

A second alternative approach to calculating γ utilizes an even more detailed model of the visual system. Although it does not probe the spatial attributes of the visual system as does the preferred approach described above, it attempts to model the processes occurring in the neural mechanism of the retina and the cortex. From psychophysical threshold data, a threshold model of the visual system can be constructed. The visual system transduces light into a neural response in a nonlinear fashion. The threshold (essentially a contrast where a signal is just detectable) is assumed to give rise to a constant neural response magnitude throughout the grey scale range, despite the fact that the threshold contrasts may vary widely throughout the grey scale range. The visual response to luminance is shown in FIG. 9a, where R is the visual response and L is luminance from the display. R+ and R− indicate the threshold deviations in visual response, while L+ and L− correspond to the luminances which give rise to R+ and R−. A simple model of the visual response, shown in FIG. 9a, as function of luminance is:

$$R = kL^p - C \qquad (8)$$

where R is the visual response to luminance L, p is usually near ½ or ⅓, and C is a constant representing a visual threshold. R is set to zero when the right hand side of equation 8 is negative. FIG. 9b shows the luminance resulting from the code value of the display for the CRT model of equation (1). In FIG. 9b, the code values $V^+$ and $V^-$ result in luminances $L^+$ and $L^-$, which in turn result in the thresholds $R^+$ and $R^-$ shown in FIG. 9a. If the observer's threshold is measured at two different grey levels, $V_1$ and $V_2$, and the code values associated with these thresholds are $V_1^+$ and $V_2^+$, (either the plus or minus threshold may be used, and only one of them is needed to calculate γ). The γ value can be determined by numerically solving the following equation:

$$\left(V_1^+ + \frac{\beta}{\alpha}\right)^{\gamma p} - \left(V_1 + \frac{\beta}{\alpha}\right)^{\gamma p} = \left(V_2^+ + \frac{\beta}{\alpha}\right)^{\gamma p} - \left(V_2 + \frac{\beta}{\alpha}\right)^{\gamma p} \qquad (9)$$

after substituting the code values for luminance equations (inverse of equation 1) for the different threshold increments ($R_1$ and $R_1^+$, $R_2$ etc.). Various improvements in visual model can be substituted for equation 8 (Response vs. Luminance), as well as various improvements in display model (equation 1). This technique can work for many visual patterns and an example is shown in FIG. 10. A test region 64 is displayed on a background 66. The observer is instructed to adjust the level of the test region 64 until it matches the background 66. However, the visual threshold must be greater than a single code value throughout the grey scale range. As mentioned earlier, this criteria is not met for an 8-bit display. Consequently, this technique is limited to displays with 9-bits or higher.

Finally, according to another alternative embodiment for determining γ, the visual system is modeled in terms of the perceived brightness as a function of luminance, where brightness is a suprathreshold response. The observer is instructed to judge a consistency of brightness differences. In this approach we assume that perceived brightness is a function of physical luminance as follows:

$$B = aL^p - c, \qquad (10)$$

where B is the perceived brightness, L is the luminance, p is a value between ⅓ and ½, a is a scaling factor and c represents a visual brightness threshold.

Figure 11:
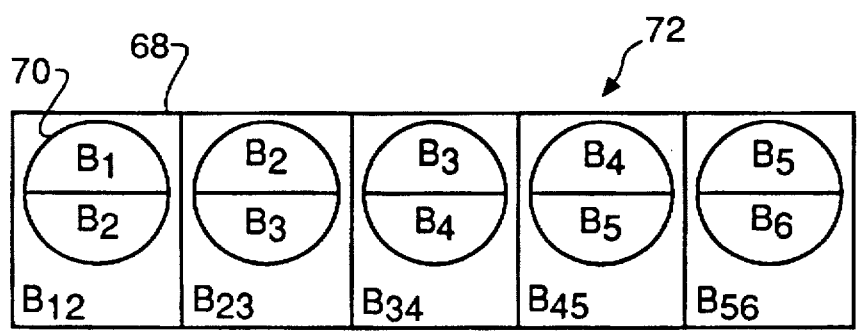
FIG. 11 is a display pattern used in a further alternative method for calibrating gamma using a visual brightness model.

With this approach, a series of rows of patches 68, as shown in FIG. 11, are created according to assumptions of various γ values. Each patch includes a circular portion having a brighter upper half with brightness $B_i$ and a darker lower half with brightness $B_{i+1}$ surrounded by a background having a brightness $B_{i,i+1}$ equal to the average of $B_i$ and $B_{i+1}$. $B_i$ is generated as follows:

$$B_i = aL_i^p - c = a\alpha^{\gamma p}\left(V_i + \frac{\beta}{\alpha}\right)^{\gamma p} - c,$$

where $V_i$ is the input code value to the CRT that generates the luminance $L_i$ which is perceived as having brightness $B_i$.

The observer is instructed to select the row that has the most uniform brightness differences across the row. The code values of a row corresponding to a specific γ are determined using the following equation for patch i (70) in row γ (72):

$$V_i = \left\{ \left(V_0 + \frac{\beta}{\alpha}\right)^{\gamma p} + i \frac{\left[\left(V_n + \frac{\beta}{\alpha}\right)^{\gamma p} - \left(V_0 + \frac{\beta}{\alpha}\right)^{\gamma p}\right]}{n} \right\}^{\frac{1}{\gamma p}} - \frac{\beta}{\alpha} \qquad (11)$$

where $V_0$ is the starting code value of the series of patches in a row, $V_n$ is the last code value of the series of patches, consisting of n total steps, and $V_i$ is the code value to be calculated for the ith step of the series. The observer is instructed to select the row where the brightness differences (as judged across the two halves of each patch 70) is the most consistent. Once again, this task utilizes a combination of the MAFC and MCS psychophysical techniques.

Estimation of φ

The estimation of the normalized offset parameter β/α should be performed in a completely darkened room, otherwise, the effect of flare light φ will contaminate the results. This fact can actually be used to estimate the flare light φ occurring in the natural working environment of the CRT display by having the observer perform this experiment twice: once in the darkened room to determine β/αdark and once in natural work lighting conditions to determine β/αnatural. With these results, $$\phi = \frac{\alpha^\gamma}{c} \left( \frac{\beta}{\alpha} \text{dark} - \frac{\beta}{\alpha} \text{natural} \right)^\gamma.$$

where c≅0.1 is the contrast threshold of the observer's visual system. Some observers may choose to skip this extra test. The result will introduce error into the estimations due to flare light. If the observer is actually using the display in a darkened room, the extra test is unnecessary.

Estimation of color temperature

A CRT color display uses three phosphors to produce three primary colors: red, green, and blue. The mixture of these three primary colors can produce a large number of colors with different hue, saturation, and brightness. Physical specification of color reproduction is usually done through the use of the CIE 1931 (X,Y,Z) tristimulus values. The relative magnitudes of the α parameters relate to color balance, and given the chromaticities of the display phosphors, will relate to color temperature. In this step of the visual characterization, it is necessary to have extra information about the chromaticities of the display phosphors, as it is extremely difficult to obtain these in a method of visual characterization. This is not a serious problem because if the observer knows the make and model of the display they are using then this information can be input to the visual characterization program. The visual characterization program can be set up to have the chromaticity coordinate data available for all the CRTs of interest to the application, and the observers task is simplified to selecting their particular display from a menu. Since the observer will have the display right in front of them, it is not difficult for them to perform this task. Finally, it is not possible to estimate the absolute $\alpha$ values for color nor even monochrome systems without more exhaustive psychophysical techniques than is reasonable for these applications. However, it is possible to estimate the ratios of $\alpha_R$, $\alpha_G$, and $\alpha_B$;

The conversion between the CRT phosphor excitations, (R,G,B) and the calorimetric tristimulus values (X,Y,Z) is achieved by a 3×3 matrix:

$$\begin{bmatrix} X \\ Y \\ Z \end{bmatrix} = \begin{bmatrix} X_R & X_G & X_B \\ Y_R & Y_G & Y_B \\ Z_R & Z_G & Z_B \end{bmatrix} \begin{bmatrix} R \\ G \\ B \end{bmatrix} = A \begin{bmatrix} R \\ G \\ B \end{bmatrix} \quad (12)$$

where $(X_R, Y_R, Z_R)$ is the CIE tristimulus value for the red phosphor when it is fully excited alone, i.e. (R,G,B)=(1,0,0), and $(X_G, Y_G, Z_G)$ and $(X_B, Y_B, Z_B)$ are the corresponding values for the green and blue phosphors. In order to fully characterize a CRT display for color reproduction, the matrix A has to be determined.

The color conversion matrix A is usually specified by stating four pairs of corresponding chromaticities in the (R,G,B) and the (X,Y,Z) color spaces. For example, if $(r_1, g_1, b_1)$ is mapped by A to $(x_1, y_1, z_1)$, $(r_2, g_2, b_2)$ to $(x_2, y_2, z_2)$, $(r_3, g_3, b_3)$ to $(x_3, y_3, z_3)$ and $(r_4, g_4, b_4)$ to $(x_4, y_4, z_4)$, then A can be determined up to a constant factor, c, thus preventing absolute estimation of $\alpha_R$, $\alpha_G$, and $\alpha_B$. It can be shown that $A = cVDU^{-1}$:

$$V = \begin{bmatrix} x_1 & x_2 & x_3 \\ y_1 & y_2 & y_3 \\ z_1 & z_2 & z_3 \end{bmatrix}, U = \begin{bmatrix} r_1 & r_2 & r_3 \\ g_1 & g_2 & g_3 \\ b_1 & b_2 & b_3 \end{bmatrix} \quad (13)$$

and $$D = \begin{bmatrix} k_1/p_1 & 0 & 0 \\ 0 & k_2/p_2 & 0 \\ 0 & 0 & k_3/p_3 \end{bmatrix} \quad (14)$$

where $$\begin{bmatrix} p_1 \\ p_2 \\ p_3 \end{bmatrix} = U^{-1} \begin{bmatrix} r_4 \\ g_4 \\ b_4 \end{bmatrix}, \text{ and } \begin{bmatrix} k_1 \\ k_2 \\ k_3 \end{bmatrix} = V^{-1} \begin{bmatrix} x_4 \\ y_4 \\ z_4 \end{bmatrix} \quad (15)$$

The four pairs of corresponding chromaticities are usually chosen to be the chromaticities of the phosphors and the chromaticity of the white point. For example, the N.T.S.C. chromaticity transformation between the phosphor primaries and the CIE XYZ primaries are listed below in Table 1.

| Stimulus | r | g | b | x | y | z |
|---|---|---|---|---|---|---|
| red phosphor | 1 | 0 | 0 | 0.67 | 0.33 | 0.00 |
| green phosphor | 0 | 1 | 0 | 0.21 | 0.71 | 0.08 |
| blue phosphor | 0 | 0 | 1 | 0.14 | 0.08 | 0.78 |
| White (Illuminant C) | 1/3 | 1/3 | 1/3 | 0.310 | 0.316 | 0.374 | and the N.T.S.C. color conversion matrix A can be determined as:

$$\begin{bmatrix} X \\ Y \\ Z \end{bmatrix} = \begin{bmatrix} 0.607 & 0.174 & 0.200 \\ 0.299 & 0.587 & 0.114 \\ 0.000 & 0.066 & 1.116 \end{bmatrix} \begin{bmatrix} R \\ G \\ B \end{bmatrix} = A \begin{bmatrix} R \\ G \\ B \end{bmatrix} \quad (16)$$

Since CRT display manufacturers usually specify the chromaticity coordinates of the phosphors they use, the only unknown is the chromaticity of the white point. There are three white points that are most frequently used by CRT display manufacturers. They are specified by the correlated color temperatures of the CIE daylight definitions: 5000K, 6500K, and 9300K, and their CIE 1931 (x,y) chromaticities are (0.3457, 0.3587), (0.3128, 0.3292), and (0.2831, 0.2971). Given a known CRT display (as per the input obtained from the observer) with known phosphors, we can calculate matrix A for each possible white point.

For visual color characterization of CRT displays, an assumption has to be made about human color perception. Through various experiments, it was found that for displays with maximum luminance between 40 and 90 cd/m², CIE illuminant C with chromaticity at (0.3101, 0.3162) against a dark surround appears to be a very good neutral to most observers. This finding can be used for visual color characterization of CRT displays using, a combination of the MAFC and MCS procedures. On the display screen, a number of grey scales are displayed and the observer is asked to select the best neutral grey.

Figure 12:
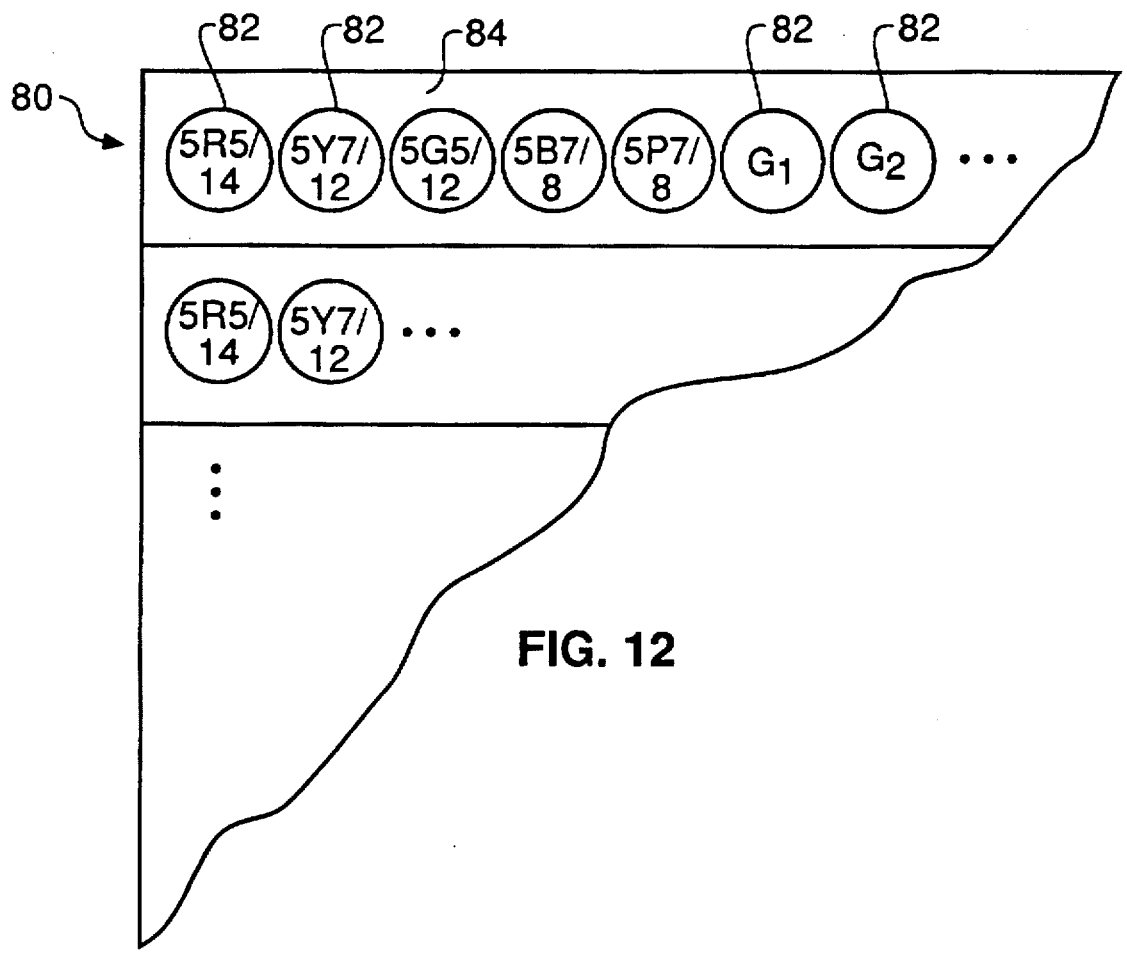
FIG. 12 shows a display pattern for visually estimating the color temperature.

Referring to FIG. 12, a color temperature test pattern comprising 5 series (partially shown) of grey scales 80 for visually estimating color temperature is shown. Each grey scale 80 consists of 12 disks 82 against a grey background 84. The left five disks in each grey scale are colored with 5 primary hues of the Munsell Color System: 5R5/14, 5Y7/12, 5G5/12, 5B7/8, and 5P7/8. These 5 primary hues are included in the grey scale pattern to prevent complete chromatic adaptation to the grey disks $G_1$–$G_7$. Table 2 lists the CIE 1931 (x,y) values associated with these Munsell color values.

| Munsell value | x value | y value |
|---|---|---|
| 5R5/14 | 0.5342 | 0.3158 |
| 5Y7/12 | 0.4677 | 0.4857 |
| 5G5/12 | 0.2104 | 0.4578 |
| 5B7/8 | 0.2204 | 0.2729 |
| 5P7/8 | 0.2918 | 0.2504 |
| CIE illuminant C | 0.3101 | 0.3162 |

The other seven disks of the grey scale are a series of greys of different Munsell values: 8, 7, 6, 5, 4, 3, and 2 (from left to right). If the maximum luminance of the display is 1.0, then these Munsell values will be 0.9, 0.7866, 0.5910, 0.4306, 0.3005, 0.1977, and 0.1200. The grey background 84 is 0.16.

Each grey scale is calculated to be the same chromaticity of the CIE illuminant C, based on the assumption that the display is white-balanced at a particular chromaticity, say, 5000K, 6500K, and 9300K CIE daylight illuminant. If the display phosphor chromaticities are known and the assumed white balance is correct, the color conversion matrix A will be correct and the grey scale will appear as a good neutral grey to the observer. If the assumed white balance is incorrect, the calculated A will also be incorrect, and the display grey scale will not appear neutral grey (in general it will appear either too yellow or too blue). Therefore, only one out of the many displayed grey scales will appear to be a good grey and that is the one that is based on the actual white point of the display (i.e. the assumed matrix A used in the calculation of the grey scale matches the matrix A inherent in the tested color CRT at its current state of adjustment).

The preferred implementation is to display 5 grey scales (consisting of series of disks from dark to light) on the display and they are calculated to be the same as illuminant C, based on 5 white points: 4062K, 5000K, 6500K, 9300K, and 18000K. This is shown in black and white in FIG. 12. For example, if the display current state of adjustment gives it a color balance of 5000K, the second grey scale (i.e. the one based on 5000K), will look the most neutral among the set of 5 grey scales. Consequently, the observer will choose that grey scale. Based on that choice, the visual characterization system will output the pre-calculated matrix A as the color conversion matrix. This information can then be sent to any color reproduction system to which it is connected. If the display's actual color balance lies between these tested color temperatures, it will be estimated with an error less than or equal to half the difference between these 5 temperatures. For the applications relevant to this invention, this degree of accuracy is sufficient. From the matrix A, the ratios of $L_R$, $L_G$, and $L_B$ can be determined for the case when $V_R=V_G=V_B=255$ (for an 8-bit system), as this is the white point for the display. The actual ratios of $\alpha_R$, $\alpha_G$, and $\alpha_B$ can be determined from the $L_R$, $L_G$, and $L_B$ ratios by solving equation 1 for $\alpha$.

Implementation Within Overall Color Reproduction System

Figure 13:
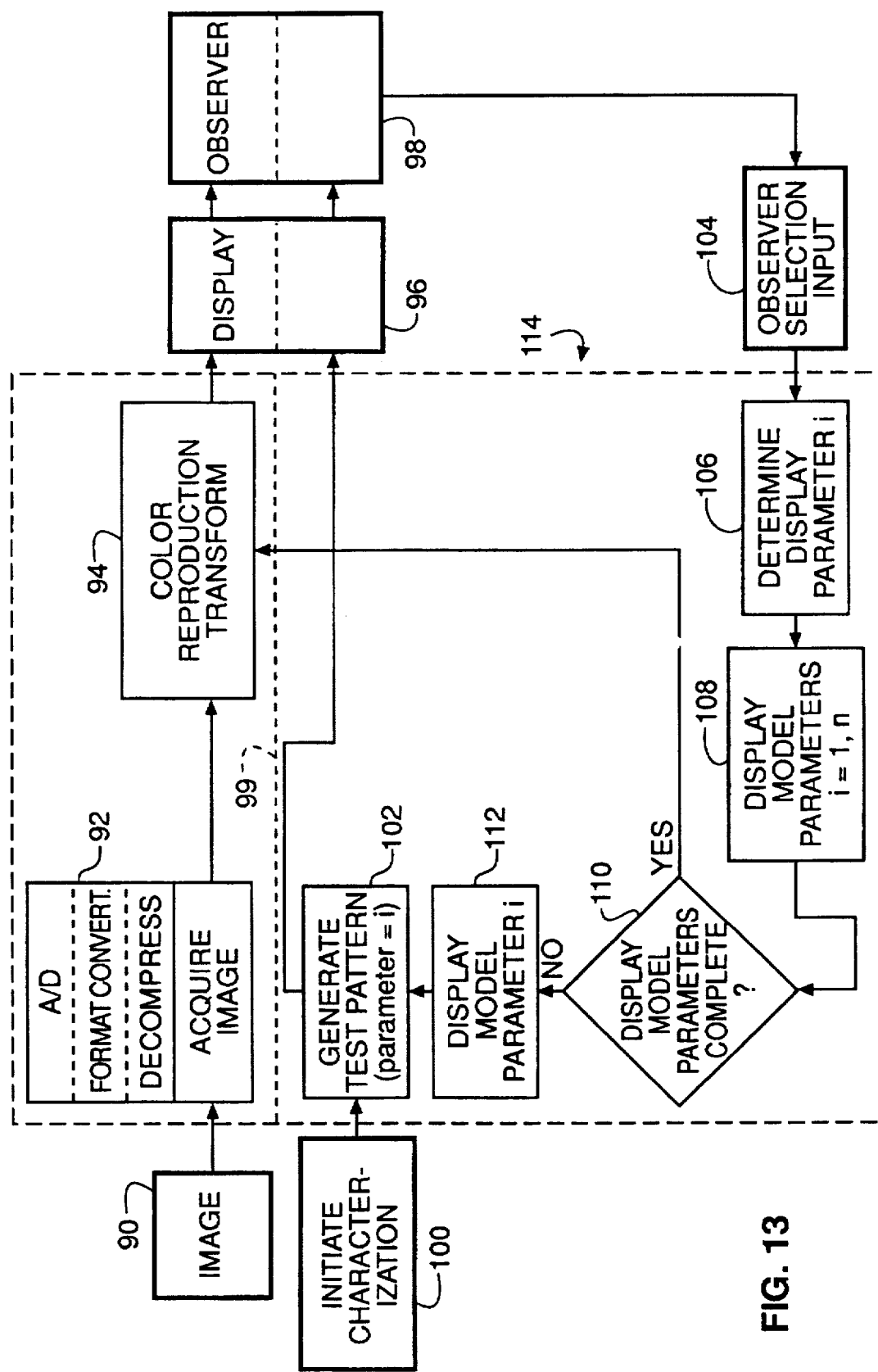
FIG. 13 is a more detailed flow chart showing the steps of calibrating a display according to the present invention, including the calibration environment and the use of the calibration information in a color reproduction process.

Referring to FIG. 13, we can see how the visual characterization method is implemented within the overall color reproduction system. Several of the components of the color reproduction system are employed in the visual characterization method, but are used in a different manner and to different end purposes than when reproducing color images. The function of the color reproduction system is to acquire an image 90 in step 92, commonly including either A/D or digital transfer, decompression, and format conversion and input calibration. Next, the image 90 is transformed 94 using a color reproduction transform which prepares the image for display on a display device 96 such that the image 90 has a desired appearance to an observer 98. These steps are shown above the horizontal dashed line 99 in FIG. 13. To accomplish the desired color appearance, the color reproduction transform 94 must include parameters or data modeling the behavior of the display 96. The present invention addresses the determination of these parameters (or values in a LUT), and is shown as lying below the horizontal dashed line 99, yet within the color reproduction system 114. The first step 100 of the present invention is to initiate the characterization process. The next step 102 is to generate a test pattern according to the display model for a first parameter i of a set of parameters, and to send this test pattern to the display 96 for viewing by observer 98. Observer 98 makes a selection response based on instructed criteria, and inputs this response to the visual characterization system in an observer selection input step 104. The visual characterization method takes this input from step 104 and calculates the display parameter i in step 106. The method then increments 108 to the next parameter of the display model. The next step 110 is to check to see if the previous parameter was the last parameter of the set of parameters for the display model. If not, the process continues with the next display parameter and after determining the next display parameter in step 112, a test pattern is generated for the new parameter 102 and it is displayed 96. If the previous parameter was the last parameter at step 110, the visual characterization procedure sends the list of parameters to the color reproduction transform 94 and the characterization process is complete.

The invention has been described with reference to a preferred embodiment. However, it will be appreciated that variations and modifications can be effected by a person of ordinary skill in the art without departing from the scope of the invention.

| PARTS LIST |
| --- |
| 10 source of digital images |
| 12 computer |
| 14 CRT |
| 16 keyboard |
| 18 mouse |
| 20 create display model step |
| 22 generate test pattern step |
| 24 apply pattern to display step |
| 26 select pattern step |
| 28 determine display parameter values step |
| 30 determine display characteristics step |
| 32 disks |
| 34 black background |
| 35 null disk; |
| 36 generate pattern step |
| 38 display pattern step |
| 40 select pattern step |
| 42 termination decision step |
| 44 reduce sampling increment step |
| 46 calculate parameter step |
| 48 continue characterization decision step |
| 50 high frequency pattern |
| 52 adjustable code value pattern |
| 54 series of patches |
| 55 transparency |
| 56–58 known density portions of transparency |
| 60–62 patches displayed on CRT |
| 64 test region displayed on CRT |
| 66 background on CRT |
| 68 patch on a background |
| 70 patch |
| 72 row of patches |
| 80 grey scale |
| 82 disks |
| 84 grey background |
| 90 image |
| 92 input and formatting step |
| 94 transform step |
| 96 display device |
| 98 observer |
| 99 dashed line separating color reproduction steps from visual characterization steps |
| 100 first step |
| 102 generate test pattern step |
| 104 selection input step |
| 106 determine display parameter step |
| 108 increment display parameters step |
| 110 check for last parameter step |
| 112 determine next display parameter step |

We claim:

1. A method for detecting the characteristics of a display device, comprising the steps of:

(a) creating a model of the display device having multiple parameters relating the physical output of the display device to an input signal creating the display;

(b) employing a model of a human visual system, generating a set of control signals for producing patterns in the display that enable an observer to employ visual selection criteria to identify specific patterns corresponding to specific values of the parameters;

(c) applying the set of control signals to the display device to produce the patterns;

(d) selecting the specific patterns from the display that correspond to the specific values of the parameters;

(e) determining the values of the parameters from the patterns selected; and (f) determining the characteristics of the display device by applying the values of the parameters to the model.

2. The method for detecting the characteristics of a display device claimed in claim 1, wherein the display device is a monochromatic CRT, and the model of the CRT is as follows:

$$L = (\alpha V + \beta)^\gamma + \phi$$

where L is the output luminance,

α is the gain,

V is the code value,

β is the offset,

γ is the gamma of the CRT, and

φ is the flare due to external lighting.

3. The method for detecting the characteristics of a display device claimed in claim 1, wherein the display device is a color CRT, and the model of the CRT is as follows:

$$L_R = (\alpha_R V_R + \beta_R)^{\gamma_R} + \phi_R,$$

$$L_G = (\alpha_G V_G + \beta_G)^{\gamma_G} + \phi_G, \text{ and}$$

$$L_B = (\alpha_B V_B + \beta_B)^{\gamma_B} + \phi_B,$$

where $L_R, L_G,$ are the output luminances of the red, green and blue phosphors, $\alpha_R, \alpha_G,$ and $\alpha_B$ are the gains of the red, green, and blue channels, $V_R, V_G,$ and $V_B$ are the code values for the red, green, and blue channels, $\beta_R, \beta_G,$ and $\beta_B$ are the offsets of the red, green, and blue channels, $\gamma_R, \gamma_G,$ and $\gamma_B$ are the gammas of the red, green, and blue channels of the CRT, and $\phi_R, \phi_G,$ and $\phi_B$ are the red, green, and blue components of flare due to external lighting.

4. Apparatus for detecting the characteristics of a display device, comprising:

(a) means for displaying a set of patterns that enable an observer to employ visual selection criteria to identify specific patterns corresponding to specific values of parameters in a model of the display device having multiple parameters relating the physical output of the display device to an input signal creating the display;

(b) means for enabling an observer to select specific patterns from the display;

(c) means for determining the values of the parameters from the patterns selected; and (d) means for determining the characteristics of the display device by applying the values of the parameters to the model.

5. The method claimed in claim 2, wherein one of said produced patterns is a series of uniform grey level disks on a black background for measuring the offset β.

6. The method claimed in claim 5, wherein disks of grey level equal to the black background are randomly interspersed in the one produced pattern to frustrate pattern extrapolation.

7. The method claimed in claim 2, wherein one of said produced patterns is a series of frequency patterns on a black background for measuring the offset β.

8. The method claimed in claim 3, wherein one of said produced patterns is a series of uniform grey level disks on a grey background for measuring the gains $\alpha_R, \alpha_G,$ and $\alpha_B$.

9. The method claimed in claim 8, wherein the series of uniform grey level disks is accompanied by series of color for preventing complete color adaptation to the grey level patches.

10. The method claimed in claim 3, wherein one of said produced patterns is a series of patterns including a flat field contiguous to a high frequency pattern for measuring γ.

11. The method claimed in claim 3, wherein one of said produced patterns is a pair of rectangular CRT primary color patches employed with a transparency of known density for measuring γ.

12. The method claimed in claim 3, wherein one of said produced patterns is a rectangle of a CRT primary color surrounded by a background of similar color for measuring γ.

13. The method claimed in claim 2, wherein one of said produced patterns is a series of uniform grey level disks on a black background for measuring the flare parameter φ.

14. The method claimed in claim 13, wherein disks of grey level equal to the black background are randomly interspersed in the one produced pattern to frustrate pattern extrapolation.

15. The method claimed in claim 2, wherein one of said produced patterns is a series of frequency patterns on a black background for measuring the flare parameter φ.

16. The method claimed in claim 1, wherein the produced patterns are displayed in step-through fashion to allow an observer to terminate the characterization of the display device at a desired image quality for any given parameter.

* * * * *